(12) United States Patent
Buell et al.

(10) Patent No.: US 8,919,483 B2
(45) Date of Patent: Dec. 30, 2014

(54) RIDDEN VEHICLE WITH INTEGRATED FUEL TANK

(71) Applicants: Erik Buell, Mukwonago, WI (US); Anthony Stefanelli, Elkhorn, WI (US); John Fox, Mukwonago, WI (US); Jonathan Bunne, Elkhorn, WI (US); Giancarlo Battaglini, Eagle, WI (US); Chad Antczak, Waukesha, WI (US); Dean Iwinski, Muskego, WI (US)

(72) Inventors: Erik Buell, Mukwonago, WI (US); Anthony Stefanelli, Elkhorn, WI (US); John Fox, Mukwonago, WI (US); Jonathan Bunne, Elkhorn, WI (US); Giancarlo Battaglini, Eagle, WI (US); Chad Antczak, Waukesha, WI (US); Dean Iwinski, Muskego, WI (US)

(73) Assignee: Hero Motorcorp, Ltd., New Delhi (IN)

( * ) Notice: Subject to any disclaimer, the term of this patent is extended or adjusted under 35 U.S.C. 154(b) by 0 days.

(21) Appl. No.: 13/731,072

(22) Filed: Dec. 30, 2012

(65) Prior Publication Data
US 2013/0168170 A1   Jul. 4, 2013

Related U.S. Application Data

(60) Provisional application No. 61/582,816, filed on Jan. 3, 2012, provisional application No. 61/582,817, filed on Jan. 3, 2012.

(51) Int. Cl.
*B60K 6/20* (2007.10)
*B62K 11/00* (2006.01)
(Continued)

(52) U.S. Cl.
CPC . *B62K 11/02* (2013.01); *B60K 6/46* (2013.01); *B62K 11/04* (2013.01); *B62J 35/00* (2013.01);
(Continued)

(58) Field of Classification Search
USPC .............. 180/65.21, 210, 211, 212, 213, 214, 180/215, 216, 217, 219, 225; 280/279, 280, 280/835
See application file for complete search history.

(56) References Cited

U.S. PATENT DOCUMENTS

| 3,252,537 A | 5/1966 | Tarran |
| 3,269,480 A | 8/1966 | Kirby |

(Continued)

FOREIGN PATENT DOCUMENTS

| EP | 1396418 | 3/2004 |
| EP | 1707479 | 10/2006 |

(Continued)

OTHER PUBLICATIONS

"Kamasura", http://www.mopedarmy.com/wiki/Kamasura, printed Dec. 29, 2011.

(Continued)

*Primary Examiner* — Joseph Rocca
*Assistant Examiner* — Marc A Scharich
(74) *Attorney, Agent, or Firm* — Hahn Loeser + Parks LLP; Arland T. Stein

(57) ABSTRACT

A ridden vehicle comprising a seat configured to be ridden and an internal combustion engine a frame configured for supporting the seat and the engine during operation of the ridden vehicle, the frame comprising a front frame portion having a steering head, a rear frame portion configured to support at least the seat and the engine, and a lower frame portion connecting the front frame portion and the rear frame portion to support a leg portion of a rider a fuel tank integrated with the front frame portion below the steering head and configured to store fuel for operation of the engine and a filler tube communicating with the fuel tank disposed in the ridden vehicle to provide an entrance to the fuel tank in front of the steering head.

18 Claims, 12 Drawing Sheets

(51) Int. Cl.
| | |
|---|---|
| *B62K 11/08* | (2006.01) |
| *B62K 11/02* | (2006.01) |
| *B60K 6/46* | (2007.10) |
| *B62K 11/04* | (2006.01) |
| *B62J 35/00* | (2006.01) |
| *B62K 11/10* | (2006.01) |

(52) U.S. Cl.
CPC ............ *B62K 11/10* (2013.01); *Y10S 903/951* (2013.01); *B62K 2202/00* (2013.01); *B62K 2204/00* (2013.01)
USPC ........ 180/225; 180/65.21; 180/219; 280/835; 903/951

(56) References Cited

U.S. PATENT DOCUMENTS

| | | | |
|---|---|---|---|
| 3,724,582 A | 4/1973 | Wood | |
| 3,945,463 A * | 3/1976 | Okano et al. | 184/6.13 |
| 4,461,489 A * | 7/1984 | Tsukiji et al. | 280/835 |
| 4,712,629 A | 12/1987 | Takahashi et al. | |
| 4,721,178 A | 1/1988 | Ito | |
| 4,726,439 A | 2/1988 | Iwao et al. | |
| 4,887,488 A | 12/1989 | Miyazaki | |
| 4,951,774 A | 8/1990 | Buell | |
| 5,054,571 A * | 10/1991 | Takasaka | 180/219 |
| 5,145,023 A | 9/1992 | Tsurumi et al. | |
| 5,193,634 A | 3/1993 | Masut | |
| 5,501,292 A | 3/1996 | Kawashima et al. | |
| 5,524,725 A | 6/1996 | Schantzen | |
| 5,657,830 A | 8/1997 | Kawashima et al. | |
| 5,670,830 A | 9/1997 | Koga et al. | |
| 5,722,502 A | 3/1998 | Kubo | |
| 5,975,230 A * | 11/1999 | Bourget | 180/225 |
| 6,037,726 A | 3/2000 | Tabata et al. | |
| 6,186,550 B1 * | 2/2001 | Horii et al. | 280/833 |
| 6,326,765 B1 | 12/2001 | Hughes et al. | |
| 6,422,332 B1 * | 7/2002 | Takata et al. | 180/68.3 |
| 6,483,198 B2 | 11/2002 | Schmitz et al. | |
| 6,484,837 B1 | 11/2002 | Buell et al. | |
| 6,516,910 B2 | 2/2003 | Buell et al. | |
| 6,555,928 B1 | 4/2003 | Mizuno et al. | |
| 6,609,585 B2 | 8/2003 | Buell et al. | |
| 6,722,460 B2 | 4/2004 | Yang et al. | |
| 6,752,229 B2 | 6/2004 | Ho | |
| 6,773,077 B2 | 8/2004 | Buell et al. | |
| 6,845,836 B2 | 1/2005 | Inaoka et al. | |
| 6,913,100 B2 * | 7/2005 | Chen | 180/225 |
| 7,392,870 B2 | 7/2008 | Kojima et al. | |
| 7,407,462 B2 | 8/2008 | Tsukada et al. | |
| 7,431,112 B2 | 10/2008 | Masuda et al. | |
| 7,463,958 B2 | 12/2008 | Suzuki | |
| 7,469,760 B2 | 12/2008 | Kamen et al. | |
| 7,475,746 B2 | 1/2009 | Tsukada et al. | |
| 7,530,417 B2 | 5/2009 | Domergue | |
| 7,665,557 B2 | 2/2010 | Hughes et al. | |
| 7,819,211 B2 | 10/2010 | Fukami et al. | |
| 7,963,358 B2 | 6/2011 | Buell et al. | |
| 8,007,005 B2 | 8/2011 | Yamashita | |
| 8,011,274 B2 | 9/2011 | Abramov | |
| 8,312,954 B2 | 11/2012 | Johnson et al. | |
| 8,348,005 B2 | 1/2013 | Hanawa et al. | |
| 8,424,626 B2 | 4/2013 | Nomura et al. | |
| 8,499,867 B2 | 8/2013 | Marcacci et al. | |
| 8,540,046 B2 | 9/2013 | Ishikawa et al. | |
| 8,556,021 B2 | 10/2013 | Nomura et al. | |
| 8,627,916 B2 | 1/2014 | Shinde et al. | |
| 2002/0033296 A1 | 3/2002 | Ohyama et al. | |
| 2003/0230440 A1 | 12/2003 | Kamen et al. | |
| 2004/0016582 A1 | 1/2004 | Ho | |
| 2004/0108154 A1 * | 6/2004 | Chen | 180/225 |
| 2005/0211481 A1 | 9/2005 | Sasamoto | |
| 2006/0027192 A1 | 2/2006 | Tsukada et al. | |
| 2006/0032689 A1 | 2/2006 | Kojima et al. | |
| 2006/0032690 A1 | 2/2006 | Inomoto et al. | |
| 2006/0219447 A1 * | 10/2006 | Saitou et al. | 180/65.2 |
| 2006/0289214 A1 | 12/2006 | Katsuhiro et al. | |
| 2007/0000703 A1 | 1/2007 | Hughes et al. | |
| 2007/0235235 A1 | 10/2007 | Fukami et al. | |
| 2007/0256873 A1 | 11/2007 | Masuda et al. | |
| 2008/0012445 A1 | 1/2008 | Abe | |
| 2008/0127915 A1 | 6/2008 | Bilek | |
| 2008/0185196 A1 | 8/2008 | Artioli | |
| 2009/0023056 A1 | 1/2009 | Adams et al. | |
| 2009/0139781 A1 | 6/2009 | Straubel | |
| 2009/0312147 A1 | 12/2009 | Oshima et al. | |
| 2010/0193275 A1 | 8/2010 | Song et al. | |
| 2010/0243349 A1 | 9/2010 | Nomura | |
| 2010/0294582 A1 | 11/2010 | Eguchi | |
| 2011/0168467 A1 | 7/2011 | Kamen et al. | |
| 2011/0259660 A1 | 10/2011 | Johnson et al. | |
| 2011/0263379 A1 | 10/2011 | Liang et al. | |
| 2012/0080249 A1 | 4/2012 | Yates et al. | |
| 2012/0208672 A1 | 8/2012 | Sujan et al. | |
| 2012/0217075 A1 | 8/2012 | Nomura et al. | |
| 2012/0241241 A1 | 9/2012 | Takamura et al. | |
| 2012/0247122 A1 | 10/2012 | Brooks et al. | |
| 2013/0069426 A1 | 3/2013 | Nien et al. | |
| 2013/0075178 A1 | 3/2013 | Petersson | |
| 2013/0081895 A1 | 4/2013 | Nomura et al. | |
| 2013/0168170 A1 | 7/2013 | Buell et al. | |
| 2013/0168171 A1 | 7/2013 | Buell et al. | |
| 2013/0184913 A1 | 7/2013 | Sujan et al. | |

FOREIGN PATENT DOCUMENTS

| | | | |
|---|---|---|---|
| EP | 1738947 | 1/2007 | |
| EP | 2113454 | 11/2009 | |
| EP | 2236338 | 10/2010 | |
| EP | 2253530 | 11/2010 | |
| EP | 2301790 | 3/2011 | |
| JP | 03246183 A * | 11/1991 | 180/225 |
| JP | 07-117774 | 5/1995 | |
| JP | 2010-228627 | 10/2010 | |
| WO | 2011127389 | 10/2011 | |

OTHER PUBLICATIONS

Abstract of Japanese Patent No. 07-117774 (English Machine Translation).

Abstract of Japanese Patent O. 2010-228627 (English Machine Translation).

* cited by examiner

RIDDEN VEHICLE WITH INTEGRATED FUEL TANK

RELATED APPLICATIONS

This application claims priority to and the benefit of U.S. Patent Application No. 61/582,816, filed on Jan. 3, 2012, and U.S. Patent Application No. 61/582,817, filed on Jan. 3, 2012, which are incorporated herein by reference.

BACKGROUND AND SUMMARY

The present disclosure relates to vehicles, namely, motorized scooters, motorcycles, and other ridden vehicles, and more particularly to a ridden vehicle having a fuel tank integrated with the vehicle frame.

Vehicles, particularly vehicles configured to be ridden such as motorized scooters, motorcycles, three-wheeled vehicles, and four wheeled vehicles such as all-terrain vehicles, have limited space to accommodate the components needed to power the vehicle. Efficient packaging of the vehicle's components is therefore desired to maintain the desired size of the vehicle. In prior systems, placement of the fuel tank has been particularly challenging because of the need to connect the fuel tank to the engine, and the need to access the fuel tank for refueling. In many prior systems, the fuel tank has been placed under the seat or between the rider's legs requiring the rider to dismount the vehicle during the refueling process. As such, there remains a need for ridden vehicles with a fuel tank that may be refueled with less inconvenience to the vehicle rider.

Prior electric scooters have utilized several different configurations each of which possess several drawbacks. In some prior designs, a low cost lead acid battery has been used; however, such batteries have limited power, extremely limited range and very limited battery durability. In other designs, higher cost chemistry batteries, such as lithium-ion, have been employed, however, these batteries are expensive and may also have limited range. Yet other designs have employed an internal combustion engine and an electric motor to alternatively drive the wheels; however, these designs are complicated by double and integrated control necessary to transition the drive system between the two power-type drives.

There remains a need in the art for a ridden vehicle that is electrically powered, but reasonably priced and with a long range of travel. The presently disclosed ridden vehicle fills that need.

Presently disclosed is a vehicle having a seat configured to be ridden and a frame configured for supporting the seat and an internal combustion engine. The frame comprises a front frame portion having a steering head, a rear frame portion configured to support at least the seat and the engine, and a lower frame portion connecting the front frame portion and the rear frame portion and adapted to support leg portions of a rider, a fuel tank integrated with the front frame portion below the steering head and configured to store fuel for operation of the engine, and a filler tube communicating with the fuel tank disposed to provide an entrance to the fuel tank in front of the steering head. In various embodiments, the vehicle may be a motorized scooter, a motorcycle, a three-wheeled ridden vehicle, a four-wheeled ridden vehicle, a snowmobile, or a personal watercraft ridden vehicle. In some embodiments, a ridden vehicle may be a vehicle adapted to be mounted by the rider, or passenger, such as with an all-terrain vehicle or tricycle.

The fuel tank may provide torsional support for the front frame portion. The lower frame portion of the vehicle may also include at least one hollow section, and the fuel tank is in fluid communication with the internal combustion engine preferably through at least one hollow section of the frame. In addition, the hollow section of the frame may be configured to store fuel for the internal combustion engine.

In some embodiments, the frame has at least one tubular portion housing a fuel line extending from the fuel tank through the at least one tubular portion to the engine. The fuel storage capacity of the integrated fuel tank may be between one liter and 7 liters, or may be between 2 and 6 liters, and may be approximately 4 liters (or one gallon) as desired. In an embodiment, the internal combustion engine is adapted to provide a drive for the vehicle, and the engine may have a displacement of at least 100 cubic centimeters or at least 150 cubic centimeters.

In another embodiment, the vehicle includes a rechargeable battery configured to be supported by the frame and to be recharged by generator powered by the internal combustion engine, and an electric motor electrically supported by the frame connected to the rechargeable battery and adapted to provide a drive for the vehicle. The internal combustion engine used to recharge the rechargeable battery may have a displacement of no more than 250 cubic centimeters, may be a displacement between 50 and 190 cubic centimeters, or a displacement of approximately 120 cubic centimeters in various embodiments. In other embodiments, the combustion engine used to recharge the rechargeable battery may have a displacement between 20 and 50 cubic centimeters, and in some embodiments 35 cubic centimeters. The rechargeable battery may be a lithium-ion battery. The ridden vehicle may also have an electronic controller that is configured to start the internal combustion engine based upon a charge level of the rechargeable battery, or in response to a rate of discharge of the rechargeable battery. The internal combustion engine may be configured to operate at a substantially constant speed while recharging the rechargeable battery. In some embodiments, the vehicle may be a motorized scooter having a floorboard, and the rechargeable battery may be mounted to a portion of the frame under the floorboard.

The ridden vehicle may be a motorized scooter with at least one seat and at least two wheels, an internal combustion engine, a rechargeable battery configured to be recharged by the internal combustion engine, an electric motor electrically connected to the rechargeable battery and configured to drive at least one of a plurality of wheels of the vehicle, and an electronic controller configured to start the internal combustion engine based upon a monitored condition of the rechargeable battery. The ridden vehicle may also have a frame having a front frame portion supporting a steering head, a rear frame portion supporting at least the seat and the internal combustion engine, and a lower frame portion connecting the front frame portion and the rear frame portion, and a fuel tank integrated with the front frame portion below the steering head and configured to store fuel for operation of the internal combustion engine. The scooter also comprises a filler tube communicating with the fuel tank disposed in the vehicle to provide an entrance to the fuel tank in front of the steering head.

Additionally, there has been a need with ridden vehicles to protect the rider from external elements such as water, precipitation and debris, particularly from the side, or from an angle in front or behind. Various lap guard or blanket type coverings have been proposed to protect the rider's body from weather. Representative are EP1396418 A2, EP1707479 A2 and EP2113454 A2. To operate such protective coverings for two wheeled vehicles, the rider must mount the vehicle and cover themselves with the sheet. Before setting the vehicle in motion, the prior art protective coverings are secured to the front of the two-wheeled vehicle, and further secured to either the rider or to the two-wheeled vehicle. The protective covering will then rest on the rider's legs causing discomfort and inconvenience to the rider. When the rider stops and desires to dismount the ridden vehicle, the rider is forced to detach the protective covering from themselves and/or the vehicle. If during operation of the two-wheeled vehicle it starts to rain, the rider needs to stop the two-wheeled vehicle and deploy the protective sheet in order to protect themselves from the rain.

These previous protective coverings have been awkward to retract and stow. Also, such protective systems are not aesthetically desirable detracting from the visual appeal of the ridden vehicle and do not meet to the expectations of users. Further, such previous systems highly impact on the mobility of the rider, hindering the ability of the rider to mount and dismount the ridden vehicle. Such previous protective systems also hinder the rider when the rider attempts to take their leg out of such coverings, leading to increased potential for accidents and fatalities. Oftentimes, the rider needs to support the ridden vehicle by placing a foot on the ground to balance the vehicle, especially when the vehicle is running at slow speeds or stationary.

Disclosed is a retractable protective cover structure for a ridden vehicle that is easily deployed and does not present a hazard to the rider's operation of the ridden vehicle. The protective cover structure comprises at least one retractable side cover structure adapted to attach to a front portion of a ridden vehicle and to extend rearward providing a protective side cover to the rider on the vehicle. The protective cover structure may be provided on both sides of the ridden vehicle. In any case, the protective cover structure has at least one actuator adapted to deploy a side cover structure at least one side of the ridden vehicle. The actuator may be electronic, pneumatic, hydraulic, or manual for deploying the protective side covers.

In some embodiments, each protective side cover, on one or both sides, of the ridden vehicle may comprise at least one feather member having a first end and a second end, the first end adapted to attach to a pivot adjacent the first end of the ridden vehicle, and adapted to rotate about the pivot to provide a protective cover structure on the ridden vehicle. Alternatively, each protective side cover may comprise at least two feather members, where the first feather member may be fixedly mounted to the front portion of the ridden vehicle. In any event, the second feather member may be rotatably mounted to the front portion of the ridden vehicle and to the first feather member and adapted to rotate rearwardly to provide a side protective cover on the ridden vehicle.

In some embodiments, each protective cover structure may comprise a lattice frame adapted to extend rearward from the front portion of the ridden vehicle, and a flexible cover adapted to attach to the lattice frame. In other embodiments, each protective side cover structure may comprise at least one slat having a first and a second end. The first end may be adapted to pivot about a fulcrum adjacent the front end of the ridden vehicle and extend rearward, and the second end adapted to receive a protective cover structure extending substantially along the slat from the second end to adjacent the first end. Furthermore, the protective cover structure for a ridden vehicle may comprise at least one side protective cover attached to the front portion of the ridden vehicle having a first portion and a second portion, the first portion adapted to extend rearwardly to provide a protective cover structure along the side of the ridden vehicle, and the second portion to extend upwardly and laterally to provide a protective cover structure over at least a portion of a riders legs seated on the ridden vehicle.

The actuator, or actuators, for deploying the one sided protective cover or two sided protective covers structure may be controlled by a control unit. The control unit adapted to receive a signal from an activation switch, activated by the rider, and receive signals from sensors adapted to detect the speed of the ridden vehicle. The control unit may be adapted to send a signal to the at least one actuator when the ridden vehicle exceeds a determined speed, to extend the at least one side protective cover structure. The control unit may also be adapted to send a signal to the at least one actuator when the vehicle reduces below a determined speed, to retract the one or both side protective covers.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION OF THE DRAWINGS

Figure 12:
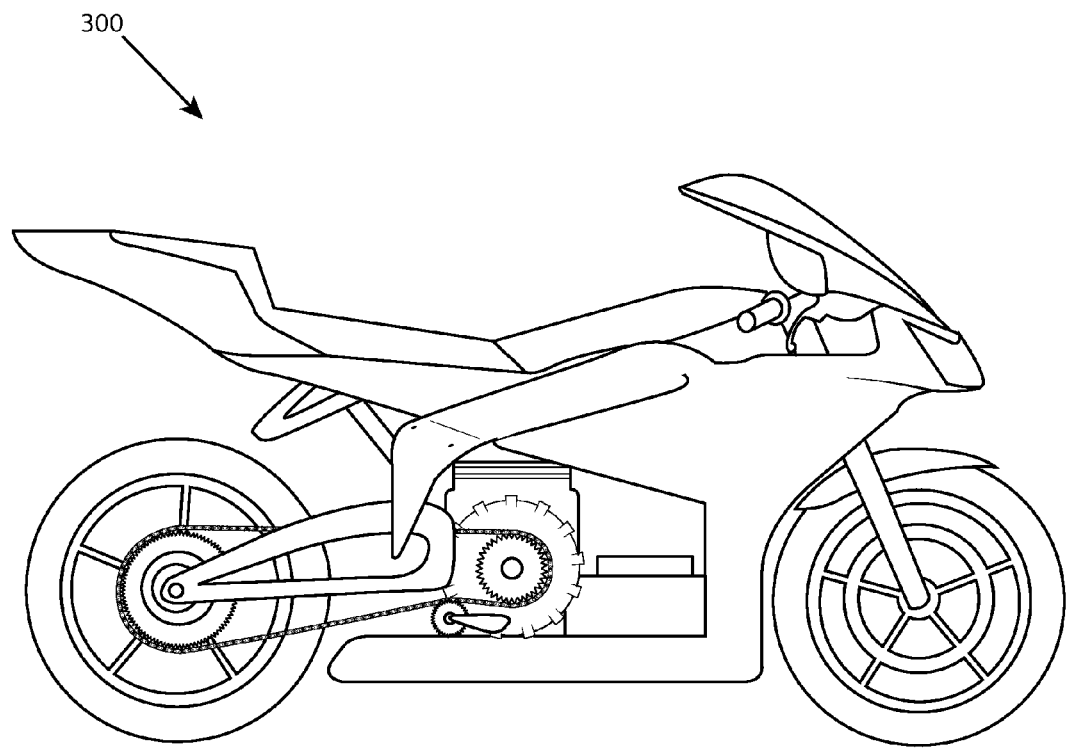
FIG. 12 illustrates a motorcycle with an integrated fuel tank.

Embodiments of a ridden vehicle having a fuel tank integrated with the vehicle frame are presently disclosed. The integrated fuel tank is illustrated in the context of a motorized scooter, however, the ridden vehicle with integrated fuel tank may also be used with other ridden vehicles, such as a motorcycle 300 (as illustrated in FIG. 12), mopeds, three-wheeled vehicles, four-wheeled vehicles, such as all-terrain vehicles, and other vehicles configured to be ridden, such as snow mobiles or personal watercraft (i.e. jet skis).

In the various embodiments, the ridden vehicle includes a seat configured to be ridden and an internal combustion engine. The ridden vehicle also includes a frame configured for supporting the seat and the engine during operation of the vehicle. The frame includes a front frame portion having a steering head, a rear frame portion configured to support at least the seat and the internal combustion engine, and a lower frame portion connecting the front frame portion and the rear frame portion. The ridden vehicle also includes a fuel tank integrated with the frame adapted to store fuel for the vehicle. In an embodiment, the fuel tank is disposed within the front frame portion below the steering head.

Figure 1:
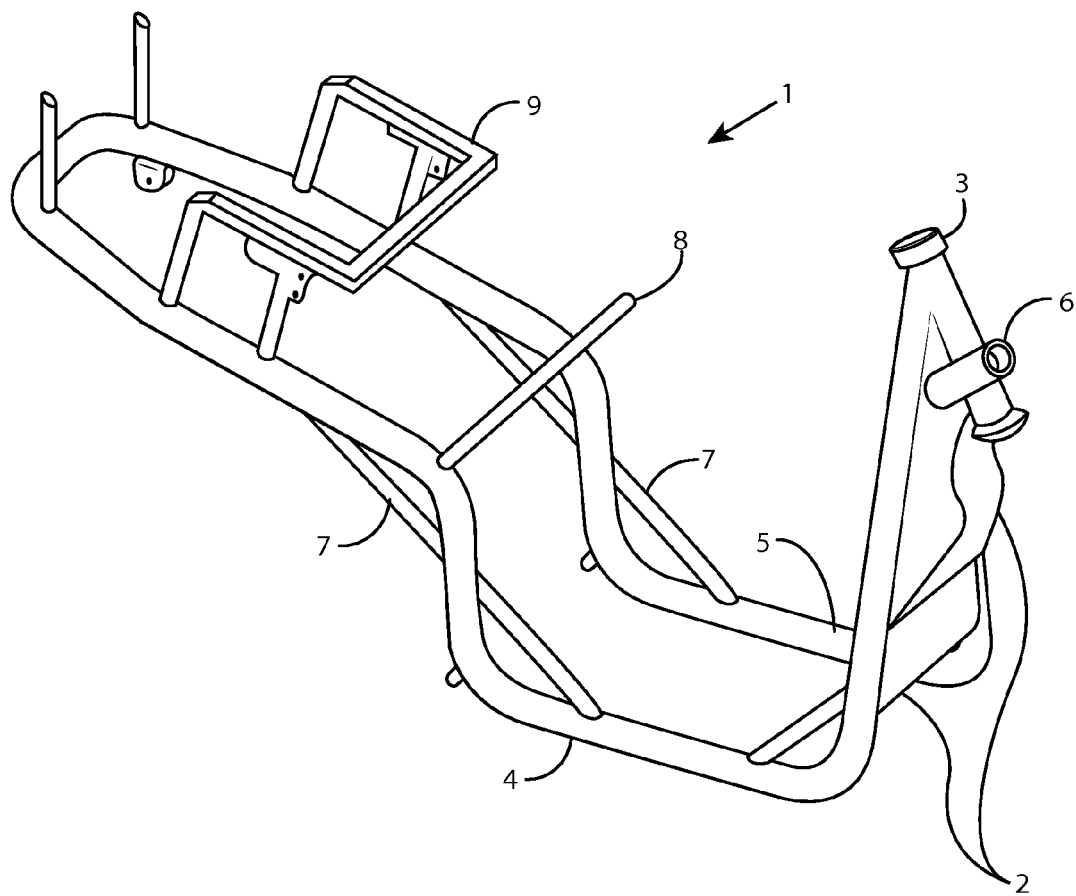
FIG. 1 is a perspective view of a frame for a ridden vehicle, the ridden vehicle in the form of a motorized scooter.

Referring to FIG. 1, a frame for a ridden vehicle in form of a motorized scooter is illustrated. In one embodiment, the frame 1 is constructed of hollow tubes that provide structural support for the components, such as the seat, engine and steering mechanism, of a motorized scooter. Additionally or alternatively, the frame may include one or more structural members other than hollow tubes, such as struts 7 which may provide diagonal bracing for portions of the frame. The frame 1 may include one or more seat mounts, such as first seat mount 8 and second seat mount 9, for securing one or more seats to the frame for the rider and a passenger. The shape and configuration of the frame 1 may be selected for the specific configuration of the ridden vehicle and may include additional portions for storage compartments or the attachment of peripheral devices as is known. In an embodiment, the frame 1 for a motorized scooter may include a triangular front frame portion connecting a steering head 3 to the lower frame tubes 4, 5. The lower frame tubes 4, 5 connect the front frame portion to the rear frame portion which supports the passenger seat and engine. A motorized scooter may also have floorboards (not shown) supported above the lower frame tubes 4, 5 on which a passenger's feet may rest when riding the vehicle.

The steering head 3 is configured to connect to a steering mechanism for the ridden vehicle. In various embodiments, the steering mechanism (not shown) is rotated by the rider to steer the vehicle. The steering mechanism may include handle bars, such as commonly used on scooters and motorcycles, but may alternatively include a steering wheel or other device for steering the vehicle. In each configuration, the steering mechanism is supported by steering head 3, which is supported by the frame 1 of the vehicle.

The ridden vehicle further includes a fuel tank 2 integrated with the frame 1 for storing fuel, such as gasoline. In an embodiment, the fuel tank 2 is a hollow structure connecting the steering head 3 to the lower frame portion. The fuel tank 2 includes a filler tube 6. The filler tube 6 may be a short section of tube extending from the tank 2 or may be internal to the tank. In each embodiment, the removable cap or cover may be provided to seal the filler tube 6 when the vehicle is in operation. The vehicle also comprises a filler tube communicating with the fuel tank disposed in the vehicle to provide an entrance to the fuel tank in front of the steering head. The filler tube 6 is positioned to enable the ridden vehicle to be refueled from the front portion of the vehicle while a rider remains on the vehicle. In contrast, prior systems have placed the fuel tank and filler tube under the seat or between the rider's legs requiring the rider to dismount the vehicle during refilling operations.

The fuel tank 2 may be integrated with the frame 1 such that the fuel tank 2, itself, provides structural support to the frame and supports the steering head 3. In some embodiments, the fuel tank occupies substantially the entire triangular front portion of the frame of a ridden vehicle such as a motorized scooter. In some embodiments, the fuel tank provides torsional support to the front frame portion of the vehicle to inhibit twisting or turning the front frame portion. The fuel tank may also provide lateral support to the lower frame tubes 4, 5. In addition or alternatively, the frame may include a lattice, webbing, or other cross bracing to further support the front portion of the frame connecting the steering head to the lower frame tubes 4, 5.

The capacity of the integrated fuel tank may be selected based upon the specifications of the ridden vehicle. For many light weight ridden vehicles, such as motorized scooters, a fuel capacity of between two liters and six liters will be sufficient to provide a desired operating range for the vehicle. In an embodiment, the integrated fuel tank has a storage capacity of four liters (or approximately one gallon). In other embodiments of the ridden vehicle such as a scooter, the capacity of the fuel tank may be increased by extending the fuel tank under the floorboards and along the lower frame tubes 4, 5. In some embodiments, the fuel tank is substantially L-shaped extending down the front portion of the frame and transitioning approximately 90 degrees to extend along at least a portion of the lower frame tubes 4, 5. The portion of the fuel tank under the floorboards may be secured to the lower frame tubes 4, 5, or may be integrally formed with the tubes 4, 5. In this manner, the capacity of the fuel tank may be increased.

In each embodiment, the fuel tank 2 may be integrated with the frame 1 such that the fuel tank 2 provides structural support for the ridden vehicle. The frame and integrated fuel tank may be formed in a variety of methods. In one example, the frame and integrated fuel tank are formed of multiple discrete pieces and welded together to complete the frame assembly. In another embodiment, the frame and fuel tank are constructed separately and then joined together during the manufacturing process to form the integrated fuel tank. In yet another embodiment, the frame may be constructed of a plurality of tubes as previously discussed. The fuel tank may comprise one or more enlarged sections of the tubes forming the frame of the vehicle. As such, the fuel may be stored in the fuel tank and/or within hollow sections of the frame as desired. In some embodiments, the frame includes at least one hollow section and the fuel tank is in fluid communication with the at least one hollow section of the frame such that the fuel tank and the at least one hollow section cooperate to store fuel for the ridden vehicle. As illustrated in FIG. 1, the hollow section of the frame may include one of the pair of lower frame tubes 4, 5, and the lower frame tube may further include a port configured to receive a fuel line to transfer fuel from the lower frame tube to the engine.

In some embodiments, the steering head 3 of the frame is connected to the lower frame rails 4, 5 by tubes extending diagonally downwardly from the steering head to form the triangular front portion of the frame. A fuel tank may be affixed between the diagonally extending tubes using conventional fastening techniques for securing a fuel tank to a vehicle frame. In this embodiment, a preexisting frame may be modified to integrate a fuel tank in the front portion of the frame to allow for refueling the ridden vehicle without displacing the vehicle's rider.

In various embodiments, the ridden vehicle includes an internal combustion engine secured to the frame. In some embodiments, the internal combustion engine may be secured to the rear portion of the frame. In some embodiments, the internal combustion engine provides the drive for the vehicle, such as by powering one or more drive wheels of the vehicle to move the vehicle. The internal combustion engine provides the drive for the ridden vehicle, which may have a displacement of at least 100 cubic centimeters, at least 150 cubic centimeters, or more, as desired, depending upon the weight and other requirements of the vehicle. As discussed further below, in another embodiment, the internal combustion engine may be used to drive a generator to generate electricity, which is then used to drive an electric motor that in turn drives at least one of the wheel of the ridden vehicle. In such embodiments, a small engine may be used. In either configuration, fuel from the fuel tank must be transferred to the internal combustion engine.

As previously discussed, the fuel tank may include a hollow structure connecting the steering head 3 to the lower frame tubes 4, 5. In some embodiments, the hollow structure forming the fuel tank may open directly into one of the lower frame tubes, such as tube 4, allowing fuel to flow from the tank through the lower frame tube to the engine in the rear portion of the frame. In this manner, the lower frame tube, such as tube 4, provides additional fuel storage capacity and forms a portion of the integrated fuel tank. The integrated fuel tank may thus be understood as the space in which fuel may be stored regardless of what other purpose or purposes the component holding the fuel may serve. In some embodiments, the lower frame tube may have a port or connection configured to receive a fuel line connecting the lower frame tube carrying the fuel to the internal combustion engine. Alternatively, the lower frame tube may have a port configured to directly supply fuel from the tube to the engine without the use of a separate fuel line further reducing the number of components in the vehicle assembly.

In other embodiments, the fuel tank 2 may have a port or connection configured to receive a fuel line, and the fuel line may extend from the fuel tank along at least a portion of the frame to the engine. A fuel line may be secured to one of the lower frame tubes as necessary. In yet other embodiments, the frame may provide protection for a fuel line extending through one of the lower frame tubes. In one example, a fuel line may exit the fuel tank disposed in the front portion of the frame and enter one of the lower frame tubes through an opening near the front portion of the frame. The fuel line may extend through the lower frame tube such that the tube protects the fuel line from damage as may be caused by road debris. The fuel line may exit the lower frame tube through an opening in the rear portion of the frame and extend to the internal combustion engine.

In some embodiments, the position of the fuel tank in the front portion of the frame reduces the airflow reaching the engine as the vehicle moves. In such embodiments, the engine may be provided with air inlets positioned to capture air flowing around or under the fuel tank so as to maintain a desired air flow to the engine for cooling. In yet other embodiments, the fuel tank may be provided with an aperture extending through the fuel tank in the direction of travel of the ridden vehicle such that air may pass through the aperture and flow to the engine. As will be appreciated, the fuel tank may be configured in a variety of shapes to accommodate air flow requirements and provide an aerodynamically desirable configuration for the vehicle.

As previously noted, the internal combustion engine may be used either as a motor to power the drive wheel(s) of the vehicle or to drive a generator to generate electricity for an electric motor. In such embodiments, the ridden vehicle may be a motorized scooter having at least one seat and at least two wheels, an internal combustion engine, a rechargeable battery configured to be recharged by the internal combustion engine, an electric motor electrically connected to the rechargeable battery and configured to drive at least one of the at least two wheels of the vehicle, and an electronic controller configured to start the internal combustion engine based upon a monitored condition of the rechargeable battery.

Figure 2:
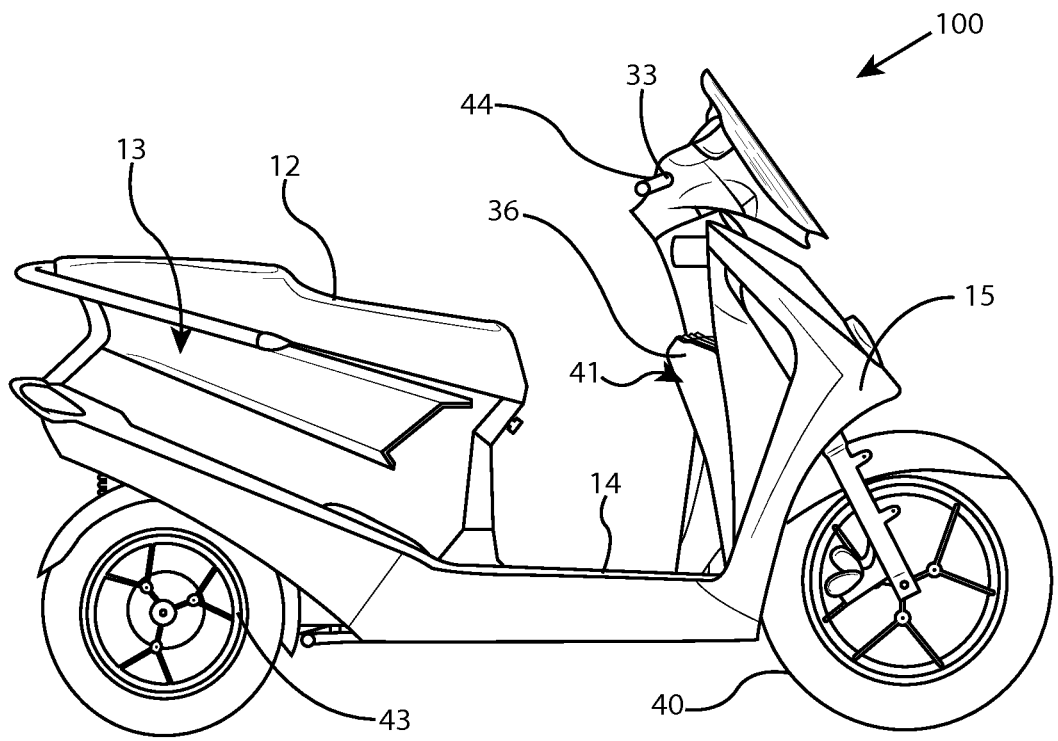
FIG. 2 is a side view of a ridden vehicle, the ridden vehicle in the form of a motorized scooter.
Figure 3:
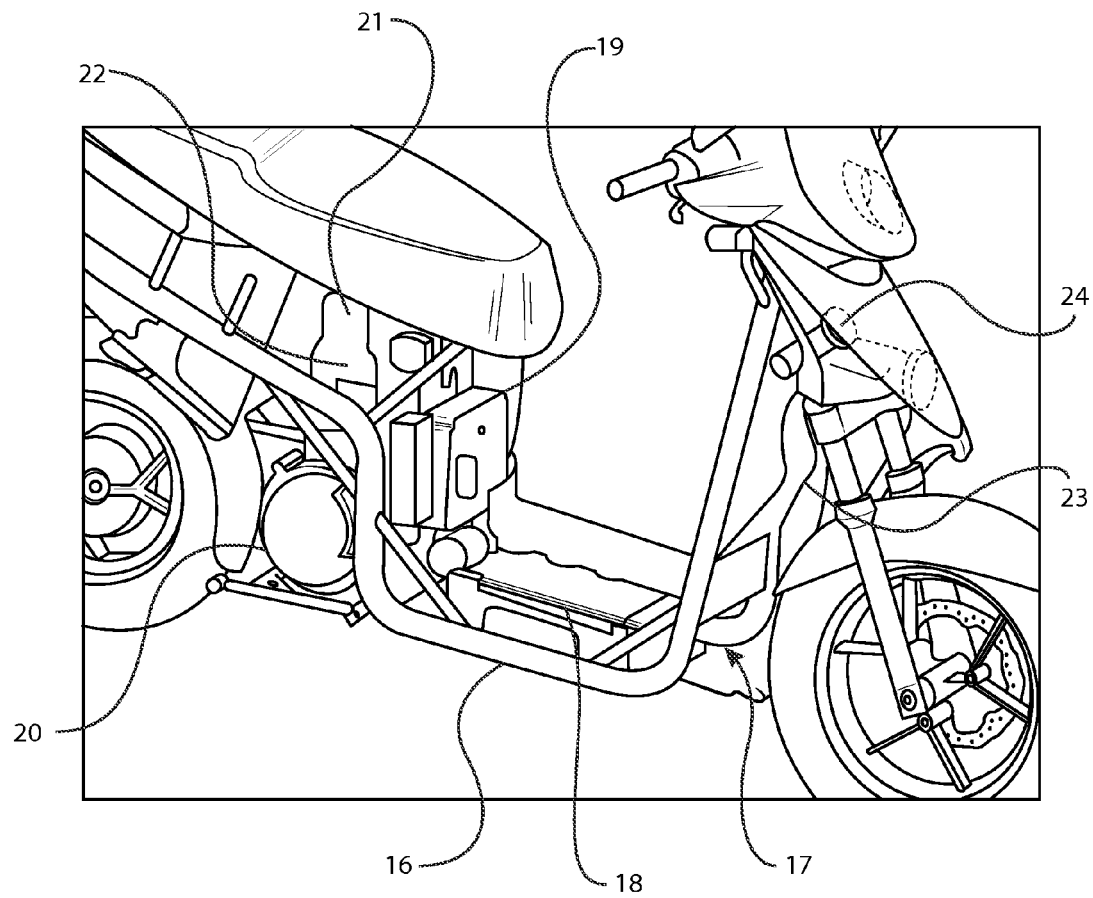
FIG. 3 is a partial perspective view of a ridden vehicle, the ridden vehicle in the form of a motorized scooter.

Referring now to FIGS. 2 and 3, an embodiment of a motorized scooter is illustrated, which includes a rechargeable battery configured to be recharged by an internal combustion engine to power a generator, and an electric motor electrically connected to the rechargeable battery and configured to provide a drive for the vehicle by powering at least the rear wheel of the scooter. As shown, the motorized scooter vehicle 10 includes a seating area 12, a storage area 13 under the seating area, a footboard 14, and a front fairing 15. In one embodiment, the rechargeable battery 18 is disposed underneath footboard 14 between lower frame rails 16, 17. The rechargeable battery 18 may be a lithium-ion battery; however, other battery chemistries may also be used. Operation of the rechargeable battery and electric motor may be managed by an electronic controller 19. The electronic controller 19 may be positioned centrally behind the rider's leg position to avoid interfering with the rider during operation of the ridden vehicle. The electric motor 20 is secured to the rear portion of the frame. As illustrated, the electric motor 20 may be bolted to a vertical section of the frame, and an internal combustion engine 21 and generator 22, or alternator, may also be secured to the frame above the electric motor. The position and orientation of the electric motor and internal combustion engine may be selected to balance the weight distribution on the vehicle and to conform to the desired dimensions of the assembled vehicle. The vehicle also includes a fuel tank 23 to store fuel for the internal combustion engine. The fuel tank 23 may be integrated into the front portion of the frame beneath the steering head and behind front fairing 15 as previously discussed. The fuel tank also includes a filler tube 24 which extends through the front fairing 15 communicating with the fuel tank for refilling the fuel tank without displacing the vehicle's rider. In such embodiments, as shown, the filler tube communicating with the fuel tank is disposed in the ridden vehicle to provide an entrance to the fuel tank in front of the steering head.

During operation, the scooter, illustrated in FIGS. 2 and 3, is operated by the electric motor 20 drawing power from the battery 18. In some embodiments, the charge level of the battery 18 is monitored. When the charge level of the battery falls below a predetermined charge level, such as 25%, 50% or 65% of full charge, the electronic controller activates the internal combustion engine 21 to power a generator recharging the battery. In other embodiments, the electronic controller may activate the internal combustion engine based upon a monitored condition of the rechargeable battery, such as the rate of discharge or load applied to the rechargeable battery. In this manner, the internal combustion engine may be activated and deactivated to maintain the desired charge level in the battery or to provide additional power under high load conditions, such as rapid acceleration or traveling up a steep hill. The internal combustion engine 21 powers a generator to recharge the battery 18 and as such may be operated at a substantially constant speed to improve the generate output with reduced fuel consumption. A substantially constant speed of operation is understood by those of skill in the art as distinguished from a variable speed operation, and entails control of the engine to a determined operating condition. In some embodiments, the internal combustion engine is operated at a power setting that yields the engine's minimum brake specific fuel consumption. For recharging the rechargeable battery, a smaller internal combustion engine may be utilized on the ridden vehicle, such as an internal combustion engine having a displacement of no more than 250 cubic centimeters, or a displacement between 50 and 190 cubic centimeters. In one embodiment, a 35 cubic centimeter displacement internal combustion engine provides adequate electrical power generation for a motorized scooter application. Once the battery 18 is recharged to a predetermined charge level, such as 95%, 98% or 100% of full charge, the internal combustion engine is shut down and the ridden vehicle operates solely on the electric motor and battery as previously discussed. The vehicle rider may select the power output of the electric motor using a throttle to control the vehicle's speed.

Other methods of charging the vehicle battery may also be employed. The vehicle may have an electrical connector configured to recharge the battery from an external electrical source, such as a generator or utility power. The vehicle may include an AC/DC converter allowing the vehicle to be charged from a standard alternating current source; however, in other embodiments, an AC /DC converter may be required to provide the necessary charging voltage to the battery.

In other embodiments, the decision to start or stop the internal combustion engine to recharge the battery may be based upon a measured rate of change of the charge level of the battery or on other operating parameters of the battery. The internal combustion engine may also be activated by the rider to recharge the battery even if the predetermined charge condition has not been reached. The internal combustion engine 21 will recharge the battery 18 during operation of the ridden vehicle provided that the generator output exceeds the load on the battery. If the generator output does not exceed the load on the battery the rate of depletion of the battery will be reduced and the battery recharged when the load is reduced, such as when the vehicle stops or when the throttle setting is reduced. As a result, the electric motor may at times be powered solely by the battery, solely by the generator, or by both the battery and generator depending upon the operating conditions of the vehicle. The terms "generator" and "alternator" are used interchangeably herein (however, it is recognized that one term or the other may be more appropriate depending on the application).

FIG. 2 also illustrates a ridden vehicle, in the form of a motorized scooter, having a protective cover structure 41. The protective cover structure 41 provides protection from external elements, such as weather, water, and debris, to the rider from the side of the vehicle or from an angle in front or behind the vehicle without interfering with the riding position, mobility of the rider, and ability of the rider to mount and dismount the vehicle.

FIG. 2 shows a side view of a ridden vehicle 10, in the form of a motorized scooter, illustrating an embodiment of the presently disclosed protective cover structure 41. The ridden vehicle 10 comprises a vehicle seat 12, control consol 33, floor board 4, front fairing 5, a protective cover structure 41, main frame body 8, handlebar 39, front wheel 40, rear wheel 43, and stand 45. The protective cover structure 41 shown in retracted position. The protective cover structure has one or more extendable and retractable side protective covers.

Figure 4:
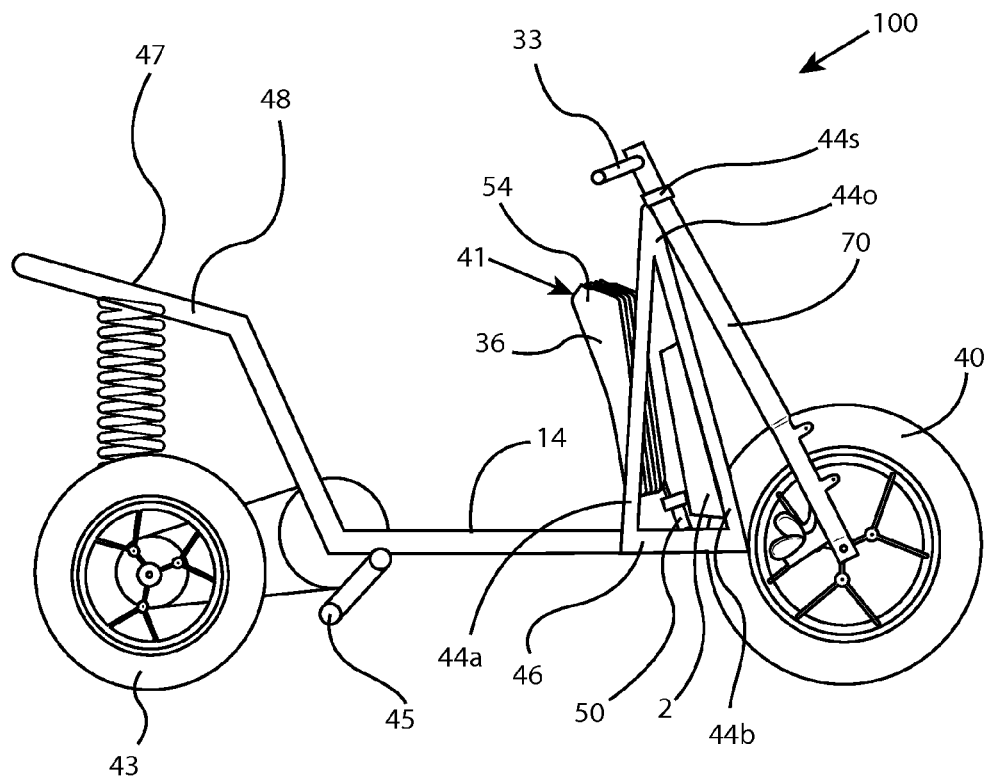
FIG. 4 is a side view of the scooter of FIG. 3, having the fairing and plastic coverings removed.

An embodiment of the main frame body 8 of a ridden vehicle 100, in the form of a motorized scooter, is shown in FIG. 4. The main frame body 8 may comprise at least one front frame portion, shown as 44a, 44b, at the front end of the vehicle, behind the front forks 70, running downwards from the common converging point 44o at the upper end of the at least one front frame portion, 44a, 44b, thereby forming substantially a triangular structure, also shown in the FIG. 6. Inclined forwardly thereof, adjacent the converging end 44o of the front frame portions 44a, 44b is a steering head 44s adapted to receive the front forks 70. A fuel tank 2 may be disposed between the space between the front frame portions 44a, 44b having a fuel inlet opening 6 to insert a spout of the fuel dispensing means. The fuel tank 2 also acts as a structural member, adapted to carry load along with the front frame portions 44a, 44b as well as with other structural members of the ridden vehicle 100.

At the lower end, the front frame portions 44a, 44b extend rearward and the bottom portions of the front frame portions 44a, 44b are opposite each other along sides of the ridden vehicle and extend to form floor frame members 46. Floor frame members may further extend upwardly and rearward, and run along each along each side to form rear frame members 47. In other embodiments, rear frame members 47 may be separate structures connected to the front frame portions 44a, 44b.

The rear frame members 47, at their upper end, extend rearward and upward to form seat rails 48 running substantially parallel to each other, whereupon the seat 12 is mounted. The seat rails 48 may merge together, at their rear end, forming a "U" like structure. In other embodiments, the seat rails 48 may be separate structures. The main frame body may also be provided with a plurality of strengthening members and suitable mountings.

The frame of the ridden vehicle may take any suitable form and is not limited to the embodiments shown in the figures or described herein. Furthermore, the described extendable and retractable protective cover structure 41 may be employed on any ridden vehicle, having any number of wheels. For example, the extendable and retractable protective cover structure 41 may be employed on a tricycle, a four-wheeled ridden vehicle such as an ATV or any other vehicle where the rider may be exposed to external elements.

Figure 5:
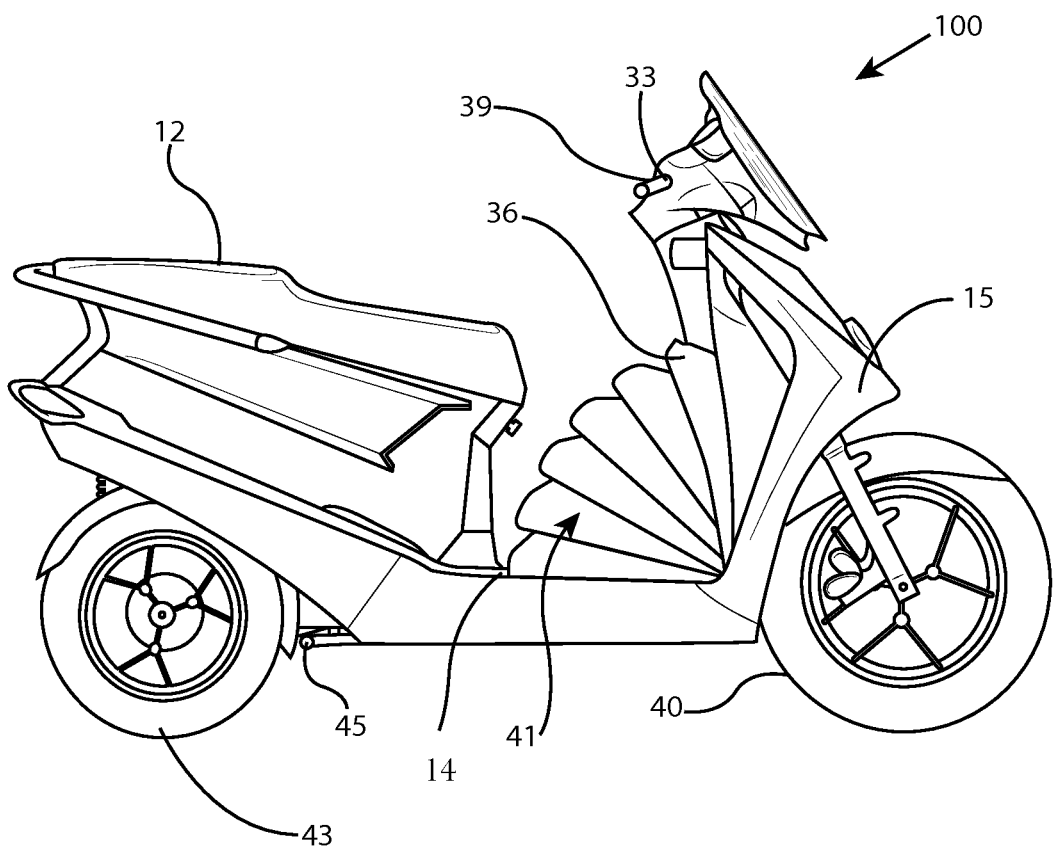
FIG. 5 is a side view of the scooter of FIG. 2, having the protective cover structure in the fully deployed position.

FIG. 5 shows the ridden vehicle 100 having a protective cover structure 41, as shown in FIG. 2, wherein the side protective covers 36 and 37, one on each side of the motorized scooter, have been deployed. The side protective covers 36, 37 may automatically or manually deploy when the speed of the ridden vehicle 100 exceeds a determined speed, to protect the rider from external elements. In some embodiments, the rider may activate the deployment of the side protective covers 36, 37 via the control consol 33, such that when the vehicle 100 exceeds the predetermined speed the side protective covers 36, 37 deploy. Alternatively, the rider may choose to not active the side protective covers 36, 37 and prevent them from deploying. In other embodiments, side protective covers 36, 37 may automatically deploy such that they remain deployed over a predetermined speed. In further embodiments, the rider may select the predetermined speed at which the side protective covers 36, 37 deploy.

Figure 6:
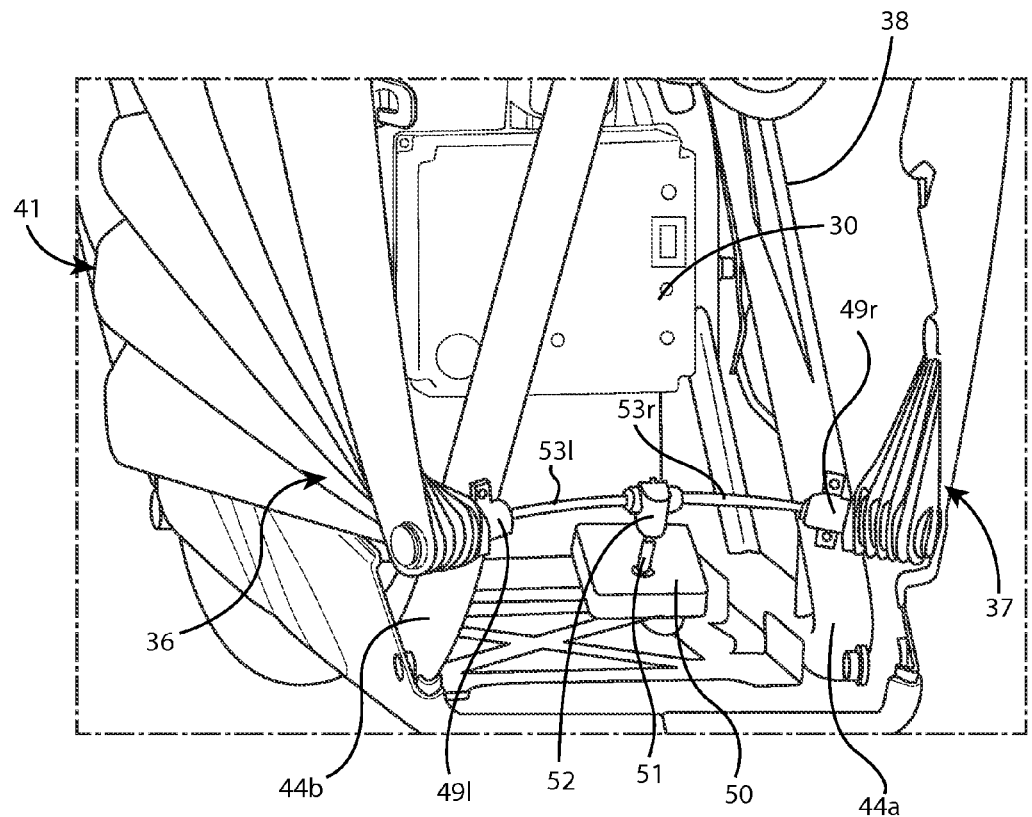
FIG. 6 illustrates a view of an embodiment of the mechanical module of the protective cover structure.

FIG. 6 illustrates an embodiment of the mechanical module for deploying the protective cover structure 41. Two output arm supporting brackets 49l, 49r may be mounted on the front frame portions 44a, 44b in the lower region thereof. In other embodiments, the brackets may be integral with the front frame portions 44a, 44b and may be any form of connector to attach the protective cover structure to the frame 38 of the ridden vehicle 100. An actuator motor 50, typically a stepper motor, may be mounted in the frontal region of the ridden vehicle 100 and may comprise a rotating shaft 51 with an axis positioned substantially upwardly. The actuation motor 50 may be electrically connected with a controller 30, generally being the vehicle's common control module, and also to a power source, such as battery, which may be located at a suitable location attached directly or indirectly to the main frame body 38. In other embodiments, the actuator motor 50 may be mounted in the frontal region of the ridden vehicle 100 and may have a rotating shaft 51 with a pivot axis positioned substantially laterally. In further embodiment the protective cover system 41 may comprise multiple motors, each motor operatively connected to each side protective cover 36, 37, independently or simultaneously extending and retracting each side protective cover 36, 37.

A mechanical module 52 to change the direction of rotation of the rotating shaft 51, for example, from an upward direction to substantially a transverse direction of the vehicle 100, may be connected to rotating shaft 51 of actuation motor 50. The mechanical module 52 may have output arms 53l, 53r, which may be flexible, and may pass through the respective bracket members 49*l*, 49*r* mounted on the front frame portions 44*a*, 44*b*. Protective side covers 36, 37 may be mounted on the respective output arms 53*l*, 53*r* of the mechanical module 52, thus, the bracket members 49*l*, 49*r* help the output arms 53*l*, 53*r* define the axis of rotation for side protective covers 36, 37.

Figure 7:
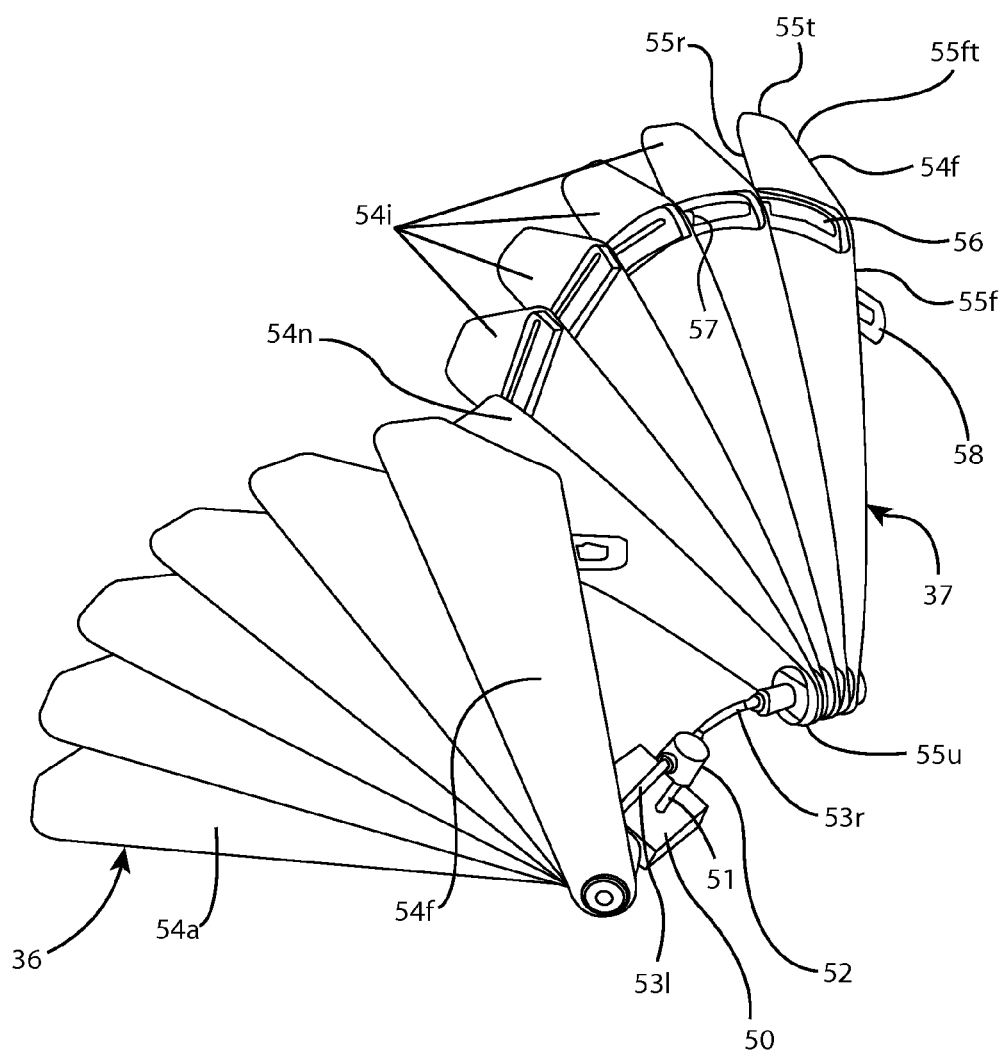
FIG. 7 illustrates an arrangement of the protective cover structure and mechanical module.

FIG. 7 illustrates an embodiment of the side protective covers 36, 37 mounted on the output arms 53*l*, 53*r* of the mechanical module 52, both the side protective covers 36, 37 have a substantially similar structure and method of mounting and hence the description of one such side protective cover structure is substantially applicable to both side protective covers 36, 37, with one reversed where applicable. Reference will now be made as to the right side protective cover 36 alone, the description is applicable to the left side protective cover 37 with appropriate elements reversed.

Figure 8:
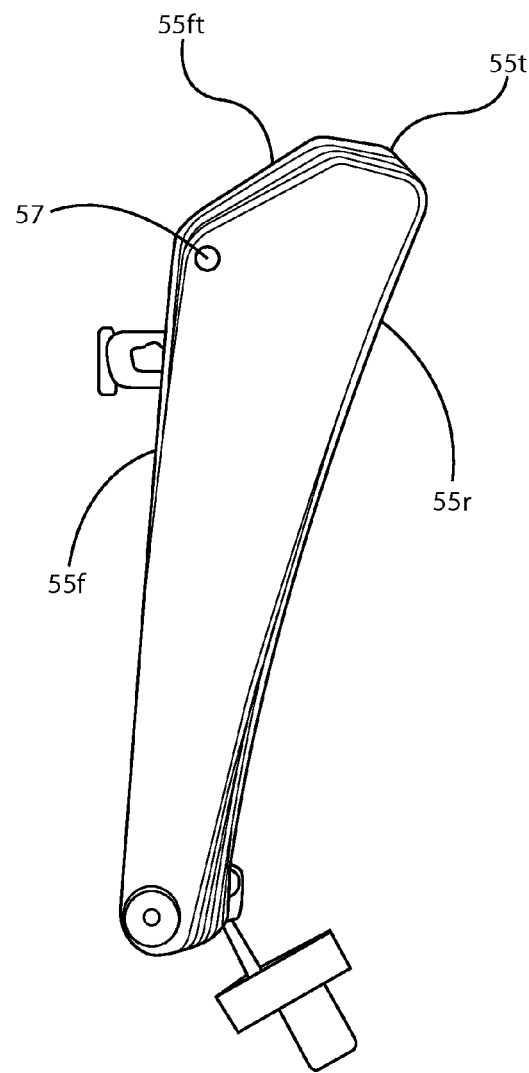
FIG. 8 illustrates one of a pair of protective covers, of a protective cover structure, in a retracted position.

In some embodiments, the protective cover 36 comprises a plurality of feathers 54. The protective cover 36 has a feather 54*n* adjacent the mechanical module 52 and a feather 54*f* farthest from the mechanical module, with intermediate feathers 54*i* there between. Each feather 54, as illustrated in FIG. 8, may be a substantially flat plate-like structure having front edge 55*f* which is arranged substantially upwardly, and a rear edge 55*r* arranged at an angle with the front edge 55*f*. Both the front edge 55*f* and the rear edge 55*r* at the lower end thereof may join together to form a "U" like structure 55*u*. Extending frontwardly from the upper end of the rear edge 55*r* and substantially lateral, is an upper edge 55*t*, and extending frontwardly and downwardly from the upper edge 55*t* and joining the upper edge 55*t* and front edge 55*f* is a front-upper edge 55*ft*.

In some embodiments, each feather 54 may have a curved shape, curved in both the long and short dimensions, such that the side protective covers 36 and 37 create a rounded protective cover 41 around the lower part of the riders body. In other embodiments, the system may comprise two feathers, one feather retracting such that it aligns, or substantially aligns, with the other feather which may be fixed to the frame and/or fairing of the vehicle 100.

In other embodiments, the side protective covers 36 and 37 may be adapted to extend rearward while the upper portions of the side protective covers 36 and 37 extend inward to provide a cover above the legs of the rider affording the rider further protection from the elements.

In the embodiment shown by FIG. 7, there is provided a journaling opening 55*o* in the lower end of the feathers 54. The feathers 54 are also provided with a protrusion 57 extending substantially perpendicular to the flat plate like feathers 54, except on the feather 54*f* attached to the frame 38 of the bike, adjacent the mechanical module 52. The protrusion 57 is provided near the lower end of the front-upper edge 55*ft* of the feathers 54. The protrusion 57 is adapted to engage with an arc-shaped track 56 on each feather, except the farthest feather 54*f* from the front frame portions 54*a* and 54*b*, such that that the protrusion 57 and the track 56 keep each feather engaged with adjacent feathers. The track 56 extending widthwise across each feather 54, and is provided near the lower end of the front upper edge 55*ft* of the feathers 54. The protrusion 57 and the arc-shaped channel 56 are provided on the opposite side of the feather 54. The feather 54*f* nearest the front frame portions 44*a*, 44*b*, is provided with the fixing provision 58 on the front edge 55*f* intended to engage, removably, with the front fairing 35 of the vehicle 100.

In some embodiments, at the time of assembly, the nearest feather 54*n* is inserted upon the output arm 53*l* of the mechanical module 52 by way of a journaling opening 55*o*, and then fixedly mounted thereupon such that the rotational motion of the output arm 53*l* is transmitted to the nearest feather 54*n*. Once the protrusion 57, on the nearest feather has travelled the entire length of the arc-shaped channel 56 of the adjacent feather 54*i*, the adjacent feather 54*i*, rotatably mounted upon the output arm 53*l* of the mechanical module 52 using the journaling opening 55*o*, is rotated to extend, and so on until each feather 54 is deployed. When the protective cover structure 41 is in the retracted position, the protrusion 57 of the feather 54 is at that corner of the curved channel 56 of the next feather 54*i*, which is at the lower end of the upper-front edge 55*ft* of the same feather 54*i*. When protective cover 36 is in the extended position, the protrusion 57 of the feather 54 is at the distal corner of the curved channel 56. Similarly, all the subsequent feathers 54*i* are mounted on the output arm 53*l* of the mechanical module 52.

A close cap 59 may then be fixed to the distal end of the output arm 53*l* such that there is almost no relative movement between the feathers 54 in the axial direction of the output arm 53*l*. The fixing provision 58 may then be fixed to the front fairing 35 of the ridden vehicle 100 so that it has substantially no relative motion with the front fairing 35, and at the same time, the protective cover 36 becomes part of the body of the ridden vehicle 100.

In an embodiment, during operation of the ridden vehicle 100 when the rider operates the protective cover switch 60 of the control consol 33 intending to extend the side protective covers 36, 37 to their extended position, a signal is sent to the controller. If the speed of the ridden vehicle 100, sensed by the speed sensors, is above the predetermined speed the controller sends a signal to the actuation motor 50 that actuates the actuation motor 50 to extend the side protective covers 36, 37 to their extended position, so that rider is protected from the foreign matter such as water, debris, etc. However, if the speed of the ridden vehicle 100 is less than the predetermined speed, and even if the rider operates the protective cover switch 60 intending to extend the side protective covers 36, 37 to their extended position, then, no signal is sent by controller to the actuation motor 50 and no action is taken and the side protective covers 36, 37 are maintained in the retracted position. Thus, the rider is free to take out their leg, supporting the vehicle with their foot on the ground, which might be required in the slow speed, or stationary, operation of the ridden vehicle 100.

Similarly, if the protective covers 36, 37 are already in the extended position and the speed of vehicle 100 goes below the predetermined speed, a signal may be automatically sent by the controller to the actuation motor 50 that retracts the protective covers 36, 37 in its retracted position. Also, if the protective cover switch 60 is already in the position for extending the protective covers 36, 37 at a predetermined speed, but speed is below the predetermined speed and the operator increases the speed exceeding the predetermined speed then the controller will automatically send the signal to actuate the actuation motor 50 adapted to swing the protective covers 36, 37 to the extended position.

In another embodiment, the extension and retraction of the protective side covers 36, 37 may be performed by mechanical, hydraulic, pneumatic actuators or any other similar actuator or any combination thereof. Such actuators may directly control the movement of the side protective covers 36, 37, or may indirectly control the movement of the side protective covers 36, 37 by way of a linkage mechanism, such as by output arms 53*l*, 53*r*.

In other embodiments, the speed of deployment of the protective covers 36, 37 may be adjusted with the help of a regulator, generally provided on the control consol 33. When the rider operates the protective cover switch 60, the protective covers 36, 37 are deployed to their extended position at the speed which is set by the regulator. The rider of the vehicle 100 may also choose to disable the deployment of the side protective covers 36, 37 so that they remain retracted. In some embodiments, deployment of the side protective covers 36, 37 may be automatic, such that the covers are deployed above a certain speed and retracted below a certain speed, without input from, or activation by, the rider.

Also, in another embodiment of the ridden vehicle 100 with a protective cover structure 41, weather sensor(s), such as a rain or snow sensor, may be mounted on the vehicle 100, typically on the control consol 33. When the weather sensor senses rain or snow, it sends a signal to the controller which, subject to the speed of the ridden vehicle 100, actuates the actuation motor 50 to extend the side protective covers 36, 37 to their extended position so that the rider may be protected from the foreign matter such as water, snow, debris, etc. Such sensors may operate to detect precipitation falling onto or near the vehicle, as well as detecting road conditions, such as wet road conditions, which may produce spray from the wheels of the vehicle 100 or from other vehicles, and actuate the deployment mechanism to extend the side protective covers 36, 37 to extend to their extended position.

Figure 9:
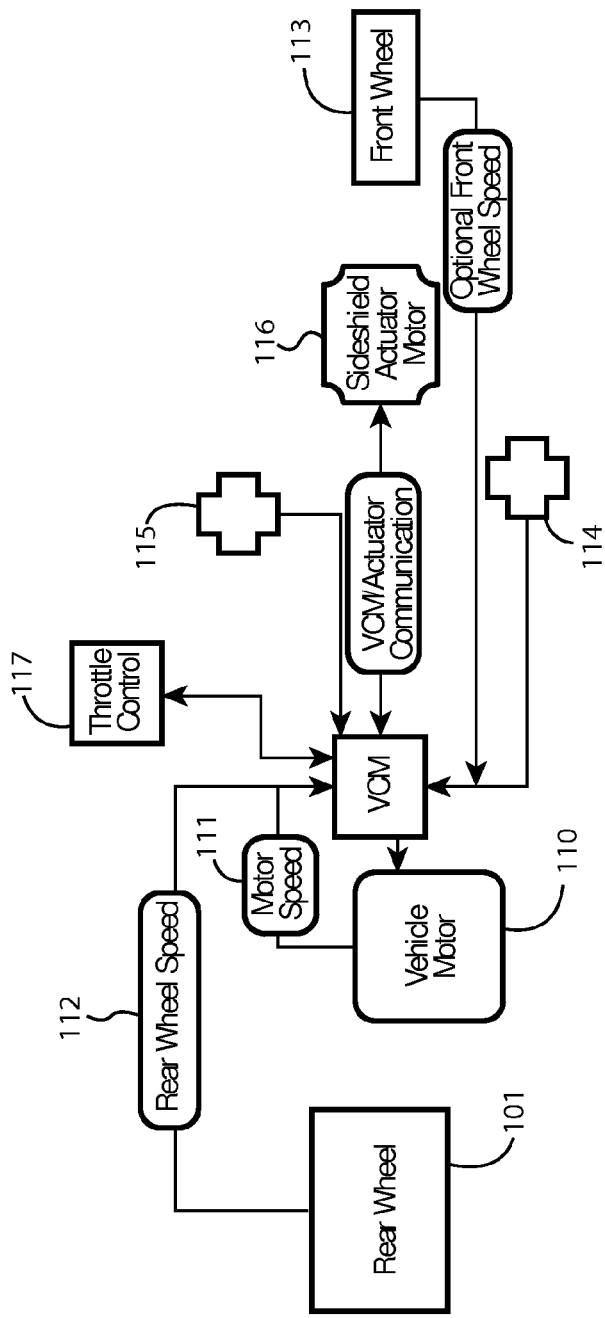
FIG. 9 illustrates an operating circuit diagram of a system for a retractable protective cover structure.

FIG. 9 is a circuit diagram for the operation of the actuator for extending and retracting a protective cover structure 41. A control circuit for a ridden vehicle 100 may comprise a vehicle control module 110. The vehicle control module 110 adapted to receive inputs from various elements of the ridden vehicle 100 and also adapted to control various elements of the ridden vehicle 100. Such inputs may comprise the motor speed 111, the rear wheel speed 112, the front wheel speed 113, environmental sensors 114, inputs from the rider selection switch 115, inputs from the side shield actuator motor 116, and inputs from the throttle control 117. The vehicle control module 110 may also be adapted to receive the inputs from the elements of the ridden vehicle 100 and control various aspects of ridden vehicle 100 such as the vehicle motor 101, or the side protective cover actuator motor 50. The speed of the bike may be determined from the rear wheel speed 112, the motor speed 111, or the front wheel speed 113, or a combination thereof. When the inputs to the vehicle control module 110 permit the vehicle control module 110 to determine that the speed of the ridden vehicle 100 has exceeded a determined speed then the vehicle control module 110 may send signal to the side protective cover actuator motor 110 to activate such that it deploys the side protective covers 36, 37. Conversely, when the vehicle control module 110 calculates that the speed of the ridden vehicle 100 is less that a determined speed the vehicle control module 110 may send a signal to the side protective cover actuator motor 116 to retract the side protective covers 36, 37.

The vehicle control module 110 may also be configured to permit the deployment of just one side protective cover if desired by the rider. Further, the ridden vehicle 100 may only have one side protective cover attached.

Figure 10:
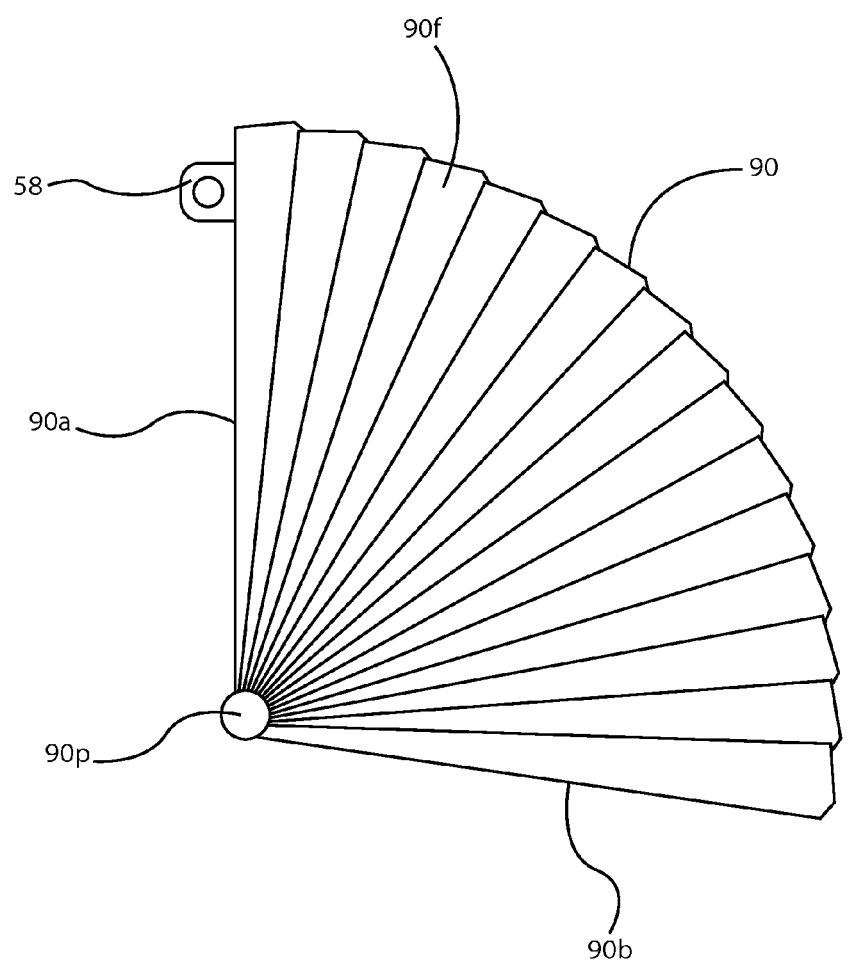
FIG. 10 illustrates another embodiment of the protective cover structure.

With reference to FIG. 10, the side protective covers 36, 37 may be formed from fan members 90, a fan member 90 provided on the either side of the vehicle 100. The fan member 90 may be shaped like a sector of a circle and made up of fabric 90f or suitable material mounted on slats 90a, 90b, which provide a frame. Such slats may be provided in overlapping arrangement and adapted to revolve around a pivot 90p of the fan member 90, adjacent and inward from one end of the slats. The fabric 90f, or other suitable material, may be provided such that it has a concertina shape and disposed upon the slats, such that when the slats evolve about the pivot point, the fabric extends into a section of a circle to provide protection from the elements. One of the slats 90a may be fixed to the vehicle, more particularly to front fairing 35 of the vehicle 100 and other slat 90b at its lower end may be fixedly mounted on the output arm 53l, when the actuation motor 50 is activated to rotate by the operator, or otherwise, the slat 90b also rotates along-with the output arm 53l, thereby the slat 90b rotates to the extended position spreading fabric 90f to cover side of the vehicle and protect the rider from foreign matter such as water, debris, etc. In some embodiments, there may be multiple actuator devices operatively connected to the slats 90a, one actuator device for each fan member 90. In other embodiments, the actuator, or actuators, may be electronic, pneumatic, hydraulic or manual, or any suitable actuator to enable the protective cover system 41 to deploy.

Figure 11:
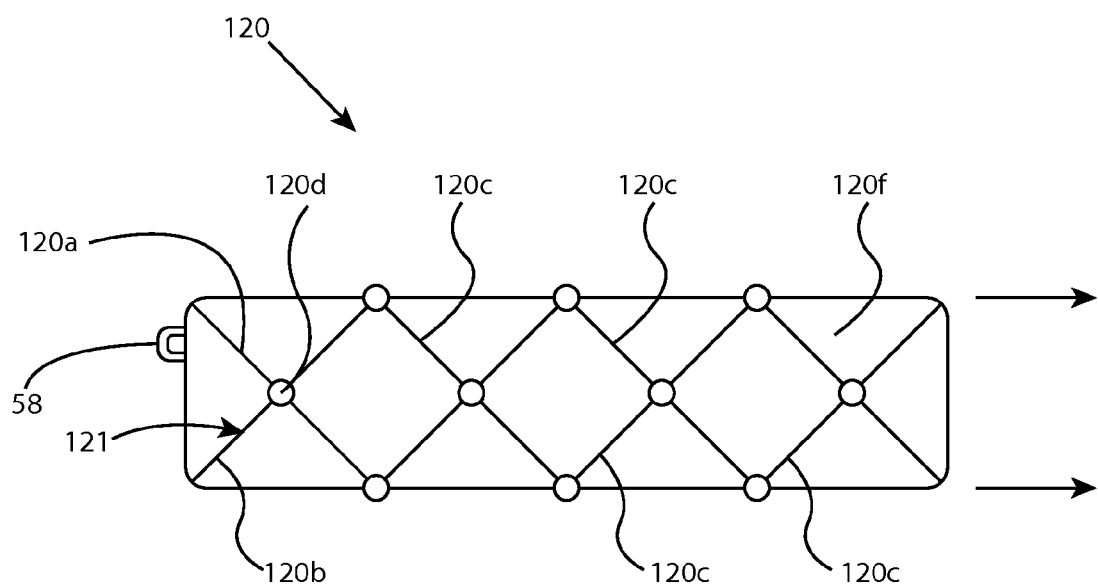
FIG. 11 illustrates a further embodiment of a protective cover structure.

Referring to FIG. 11, there is shown yet another embodiment of a protective cover structure. Illustrated is a sliding protective cover structure. One such protective cover structure may be provided on either side of the ridden vehicle 100. Such a sliding protective cover structure may comprise fabric 120f, for example, attached to the structure 120. The fabric 120f may be mounted to a lattice frame 121. The lattice frame 121 having input links 120a, 120b operably connected to an actuator, the actuator adapted to move the input links 120a, 120b toward each other and away from each other. An actuator may be connected to a pivot point 120d, the pivot point 120d having gears or a screw mechanism to move extend or retract the lattice by rotating the gears or screw mechanism. When the input links 120a, 120b are pulled inward by the actuator, the links 120c move in outward direction as depicted by the arrow (A) so that the structure 120 and the fabric 120f extend along the side of the vehicle to protect the rider from foreign matter such as water, debris, etc. The structure 120 can also be supported and guided by the channel disposed on the floor board 14 of the vehicle 100. Alternatively, any other straight line mechanism can be used for this purpose.

In alternative embodiments, the protective cover structure may be a single piece. The protective cover structure may be mounted outboard of the front fairing such that it may rotate forward to allow the rider to mount and dismount the vehicle, while not interfering with the mobility of the front wheel. In other embodiments the side protective cover structure may rotate outwardly, as well as, or instead of, retracting. Such a system may be useful if the rider still desires to be afforded some protection when stationary and supporting the vehicle with their foot on the ground. The protective cover may rotate outwardly to a sufficient angel to allow the rider to move their foot to the ground without obstruction, while still affording the rider some degree of protection from external elements.

It will be appreciated by those of reasonable skill in the art, that various modifications can be made, and that many changes can be made to the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

What is claimed is:

1. A vehicle comprising:
 a seat configured to be ridden and an internal combustion engine;
 a frame configured for supporting the seat and the engine during operation of the vehicle, the frame comprising a front frame portion having a steering head, a rear frame portion configured to support at least the seat and the engine, and a lower frame portion connecting the front frame portion and the rear frame portion, where the lower frame portion is configured to support a leg portion of a rider;

a fuel tank integrated with the front frame portion below the steering head and configured to store fuel for operation of the engine, such that the fuel tank provides structural support for the vehicle; and, a filler tube communicating with the fuel tank, where the filler tube is disposed in the vehicle to provide an entrance to the fuel tank located in front of the steering head.

2. The vehicle as claimed in claim 1, where the vehicle is a motorized scooter.

3. The vehicle as claimed in claim 1, where the vehicle is a motorcycle.

4. The vehicle as claimed in claim 1, where the fuel tank provides torsional support for the front frame portion.

5. The vehicle as claimed in claim 1, where the lower frame portion comprises at least one hollow section, and the fuel tank is in fluid communication with the internal combustion engine through the at least one hollow section of the lower frame portion.

6. The vehicle as claimed in claim 5, where the at least one hollow section of the lower frame portion is configured to store fuel for the internal combustion engine.

7. The vehicle as claimed in claim 1, where the frame further comprises at least one tubular portion housing a fuel line extending from the fuel tank through the at least one tubular portion to the engine.

8. The vehicle as claimed in claim 1, where a fuel storage capacity of the integrated fuel tank is between 2 and 6 liters.

9. The vehicle as claimed in claim 1, where the internal combustion engine is adapted to provide a drive for the vehicle.

10. The vehicle as claimed in claim 1, where the internal combustion engine has a displacement of at least 100 cubic centimeters.

11. The vehicle as claimed in claim 1 further comprising:
a rechargeable battery configured to be supported by the frame and to be recharged by the internal combustion engine, and
an electric motor supported by the frame and electrically connected to the rechargeable battery and adapted to provide a drive for the vehicle.

12. The vehicle as claimed in claim 11, where the internal combustion engine has a displacement of no more than 250 cubic centimeters.

13. The vehicle as claimed in claim 11, where the internal combustion engine has a displacement of between 50 and 190 cubic centimeters.

14. The vehicle as claimed in claim 11, where the rechargeable battery is a lithium-ion rechargeable battery.

15. The vehicle as claimed in claim 11 further comprising:
an electronic controller configured to start the internal combustion engine based upon a charge level of the rechargeable battery.

16. The vehicle as claimed in claim 11 further comprising:
an electronic controller configured to start the internal combustion engine based upon a rate of discharge of the rechargeable battery.

17. The vehicle as claimed in claim 11, where the internal combustion engine is configured to operate at a substantially constant speed while recharging the rechargeable battery.

18. The vehicle as claimed in claim 11, where the vehicle is a motorized scooter having a floorboard, and where the rechargeable battery is mounted to a portion of the frame under the floorboard.

* * * * *